(12) United States Patent
Ozeki

(10) Patent No.: US 7,472,772 B2
(45) Date of Patent: Jan. 6, 2009

(54) STRUCTURE FOR INSTALLING REAR CUSHION

(75) Inventor: Shinichi Ozeki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 489 days.

(21) Appl. No.: 10/776,525

(22) Filed: Feb. 12, 2004

(65) Prior Publication Data

US 2004/0178599 A1    Sep. 16, 2004

(30) Foreign Application Priority Data

Feb. 20, 2003  (JP)  ............................ 2003-043076
Feb. 26, 2003  (JP)  ............................ 2003-049798

(51) Int. Cl.
*B62D 61/00* (2006.01)
(52) U.S. Cl. .................. 180/218; 280/124.128
(58) Field of Classification Search ................. 180/218, 180/219, 227; 280/124.128, 124.111, 124.125
See application file for complete search history.

(56) References Cited

U.S. PATENT DOCUMENTS

| | | | |
|---|---|---|---|
| 4,273,220 A | | 6/1981 | Tilkens |
| 5,062,495 A | | 11/1991 | Padgett |
| 5,375,677 A | * | 12/1994 | Yamagiwa et al. .......... 180/219 |
| 5,531,289 A | * | 7/1996 | Muramatsu ................. 180/227 |
| 5,839,536 A | * | 11/1998 | Tanaka ....................... 180/227 |
| 6,024,185 A | * | 2/2000 | Okada et al. ................ 180/227 |
| 6,325,402 B1 | * | 12/2001 | Gogo et al. .................. 280/279 |
| 6,412,615 B1 | | 7/2002 | Perez |
| 6,481,523 B1 | * | 11/2002 | Noro et al. .................. 180/227 |
| 6,595,310 B2 | * | 7/2003 | Gogo .......................... 180/219 |
| 6,691,814 B2 | * | 2/2004 | Toyoda ....................... 180/227 |
| 6,722,461 B2 | * | 4/2004 | Gogo .......................... 180/227 |
| 6,860,353 B2 | * | 3/2005 | Miyashiro ................... 180/227 |
| 7,097,259 B2 | * | 8/2006 | Toyoda ..................... 301/110.5 |
| 7,178,620 B2 | * | 2/2007 | Toyoda ....................... 180/227 |
| 2005/0087947 A1 | * | 4/2005 | Fujita .................... 280/124.128 |

FOREIGN PATENT DOCUMENTS

| | | |
|---|---|---|
| EP | 1188657 A2 | 3/2002 |
| EP | 1223101 A2 | 7/2002 |
| EP | 1247730 A2 | 10/2002 |
| EP | 1273509 A2 | 1/2003 |
| JP | 57-66984 U | 4/1982 |
| JP | 59-100695 U | 7/1984 |
| JP | 11-59545 A | 3/1999 |
| JP | 2003-11875 A | 1/2003 |
| JP | 02003011875 A * | 1/2003 |

* cited by examiner

*Primary Examiner*—Toan C To
(74) *Attorney, Agent, or Firm*—Birch, Stewart, Kolasch & Birch, LLP

(57) ABSTRACT

A structure for installing a rear cushion in a motorcycle having a hydraulic shock absorber with a subsidiary cylinder used as the suspension device. The rear swing arm includes a pair of left and right arm portions, the respective front portions being coupled with a first cross member and a second cross member. A pair of cushion brackets extend in the back-and-forth direction with the upper portion of the rear cushion sandwiched therebetween. The front and rear ends of the cushion brackets are coupled to the first and second cross members, thereby supporting the cushion brackets at both ends. An upper portion of the rear cushion fits within a space enclosed by the first and the second cross members, and the left and right cushion brackets, and is coupled to the intermediate portion of the left and right cushion brackets.

18 Claims, 8 Drawing Sheets

STRUCTURE FOR INSTALLING REAR CUSHION

CROSS-REFERENCE TO RELATED APPLICATIONS

The present application claims priority under 35 U.S.C. § 119 to Japanese Patent Application Nos. 2003-043076, filed Feb. 20, 2003, and 2003-049798, filed Feb. 26, 2003, the entire contents of which are hereby incorporated by reference.

BACKGROUND OF THE INVENTION

1. Field of the Invention

The present invention relates to structure for installing a rear cushion in a motorcycle, and to a hydraulic shock absorber with a subsidiary cylinder to be used in a suspension device of the motorcycle.

2. Description of Background Art

In a certain rear suspension mechanism of a motorcycle or the like, a front end of a vehicle body-side rear swing arm is supported in such a manner as to be freely rock-able by a pivot shaft, the rear swing arm is provided with a cushion bracket in the upper portion on the front end side thereof, the lower end of the rear swing arm on the front end side is coupled to the vehicle body side through a link, and the upper and lower portions of the rear cushion are supported between this link and the cushion bracket (See, for example, Japanese Patent Laid-Open No. 2002-68066).

In this conventional structure, a pair of left and right rear swing arms are provided with the above-described cushion brackets so as to make a pair with each other, protruding upward in a substantially mountain shape respectively. Also, each cushion bracket supports the rear cushion at an upper end which becomes a free end, and is supported on the rear swing arm only at the lower end. Therefore, when the cushion bracket is viewed in terms of one side of left and right, each is constructed to, so to speak, cantilever-support the rear cushion. For this reason, in order to secure as great installation rigidity as possible for supporting a heavy load of the rear cushion, the cushion bracket cannot avoid becoming large size, but as a result, the weight has been increased to increase the cost.

In another conventional structure, there is a hydraulic shock absorber with a subsidiary cylinder having a cylinder which is a hydraulic cylinder for generating a damping force, and a subsidiary cylinder to be connected through a crooked oil path from this cylinder, in which there is provided a gas chamber within the subsidiary cylinder (See, for example, Japanese Patent Publication No. 61-7393).

In the situation where an oil path is provided and is connected to a subsidiary cylinder as in the case of the above-described conventional example, when a cylinder contracts at high speed, hydraulic fluid flows through the oil path, and a high reaction force is stored in a gas chamber of the subsidiary cylinder while when the cylinder is changed into expansion, restoration of the gas chamber causes the hydraulic fluid which has flowed into the subsidiary cylinder to return to the cylinder. At this time, since the diameter of the oil path is small, a flow velocity of the hydraulic fluid becomes high, and therefore, there occurs an unexpected damping force. Since, however, such a damping force is not necessary for the intrinsic shock absorber, it is requested to prevent such a damping force from occurring.

SUMMARY AND OBJECTS OF THE INVENTION

The objective of the present invention is to address the above described problems and limitations of conventional structures.

A first object of the present invention is to provide a small-sized, light-weight and low-priced cushion bracket having high rigidity.

In order to solve the above-described problems, a first aspect of the present invention provides structure for installing a rear cushion including a rear suspension equipped with: a rear swing arm, the front end of which is supported in such a manner as to be freely rock-able on the vehicle body side through a pivot shaft, and the rear wheel of which is supported at the rear end; a cushion bracket provided on the upper portion of this rear swing arm on the front end side; a link for coupling the lower portion of the rear swing arm on the front end side to the vehicle body side; and a rear cushion the upper and lower portions of which are supported by this link and the cushion bracket. In addition, when the structure is observed from its side, the cushion bracket extends in a back-and-forth direction beyond the upper portion of the rear cushion, both end portions thereof before and behind are coupled to the rear swing arm, and the upper portion of the rear cushion is supported by the intermediate portion in the back-and-forth direction.

With the first aspect of the present invention, since the cushion bracket has been extended long in a back-and-forth direction beyond the upper portion of the rear cushion and the both ends thereof have been coupled to the rear swing arm, when the intermediate portion of the cushion bracket is caused to support the upper portion of the rear cushion, the cushion bracket will be constructed to support the rear cushion at both ends when observed from its side. For this reason, the installation rigidity of the cushion bracket becomes higher, and yet it is possible to miniaturize, to reduce the weight and to reduce the cost.

A second aspect of the present invention provides a structure for installing a rear cushion provides the rear swing arm with a pair of left and right arm portions, and also provides a pair of left and right cushion brackets, the respective front and rear end portions being coupled to first and second cross members provided at an interval in the back and forth direction between upper portion of the left and right arm portions on the front end side.

With the second aspect of the present invention, the rear swing arm has been provided with a pair of left and right arm portions, a pair of left and right cushion brackets have been provided, front and rear end portions of the left and right cushion brackets have been coupled to a pair of cross members provided at intervals before and behind between the upper portions of the left and right arm portions on the front end side. Therefore, when the upper portion of the rear cushion is coupled to between the intermediate portions of the left and right cushion bracket, this coupled portion can be provided with the highest rigidity A third aspect of the present invention provides a structure for installing a rear cushion, wherein the upper portion of the rear cushion is supported between the left and right cushion brackets, and has a sub-cylinder which has been arranged through space enclosed with the left and right cushion brackets and the first and second cross members before and behind.

With the third aspect of the present invention, since there is formed space enclosed with the left and right cushion brackets and the first and second cross members before and behind, this space can be utilized to dispose a sub-cylinder of the rear cushion. Moreover, there is no need for the provision of special space for disposing the sub-cylinder, but the space efficiency can be improved.

According to a fourth aspect of the present invention the hydraulic shock absorber is provided with a cylinder for generating a damping force by sliding of a built-in piston, and a subsidiary cylinder having a gas chamber disposed non-coaxially to the cylinder. The cylinder and the subsidiary cylinder are connected through a crooked oil path. A diameter of the oil path is larger than a distance between a tip portion of an inner wall of the cylinder and a top of the piston when the piston is at its maximum compression stroke.

With the fourth aspect of the present invention, since a diameter of the oil path is larger than a distance with a tip portion of an inner wall of the cylinder at the maximum stroke of the piston, capacity of the hydraulic fluid can be secured even in the vicinity of the maximum stroke, the flow velocity thereof can be rendered uniform, and the damping force is stabilized. Also, since an axis of the cylinder has been made non-coaxial to that of the subsidiary cylinder, the subsidiary cylinder is to be arranged at an angle with respect to the cylinder, and even if the subsidiary cylinder is placed side by side with the cylinder, the overall length can be managed to become nearly the same length as the cylinder to make it compact.

According to a fifth aspect of the present invention, the diameter of the oil path is substantially the same as an inner diameter of the cylinder.

With the fifth aspect of the present invention, since the diameter of the oil path is substantially the same as that of the cylinder, the hydraulic fluid which passes through the oil path hardly generates any unexpected damping force. Also, sufficient capacity of the hydraulic fluid can be secured.

According to a sixth aspect of the present invention, the oil path is provided with a bulkhead for partitioning the gas chamber off, and further, the bulkhead is provided with drawing means.

With the sixth aspect of the present invention, since the bulkhead has been provided with drawing means, it is possible to properly adjust the hydraulic pressure against pressure to be applied by the gas chamber by adjusting the damping force even if the diameter of the oil path is large.

According to a seventh aspect of the present invention, an axis of the cylinder and an axis the subsidiary cylinder are aligned parallel to each other.

With the seventh aspect of the present invention, since each axis of the cylinder and the subsidiary cylinder has been made parallel, their respective machining axes coincide with each other and machining becomes easier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
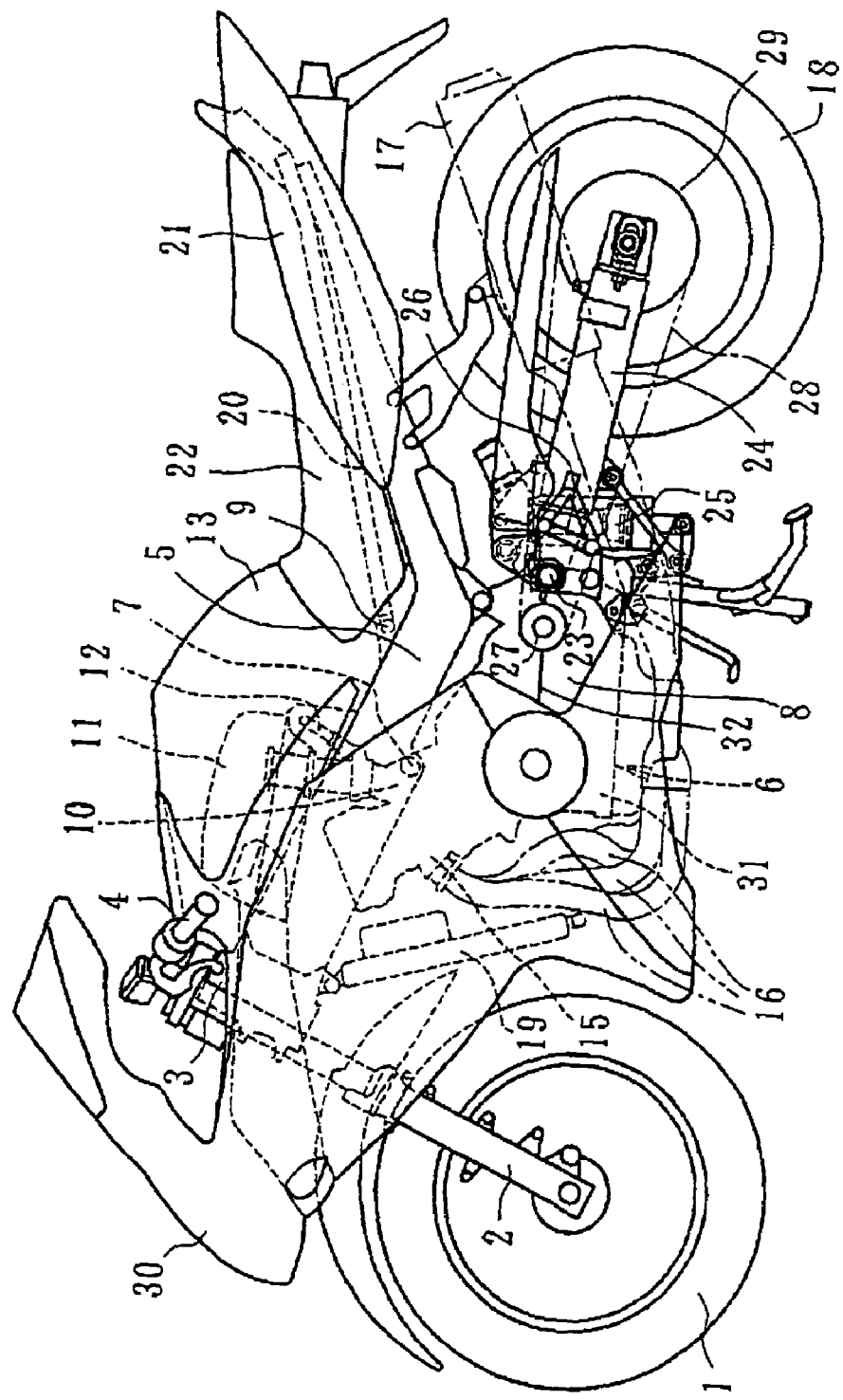
FIG. 1 is a side view showing a motorcycle according to the present example.
Figure 2:
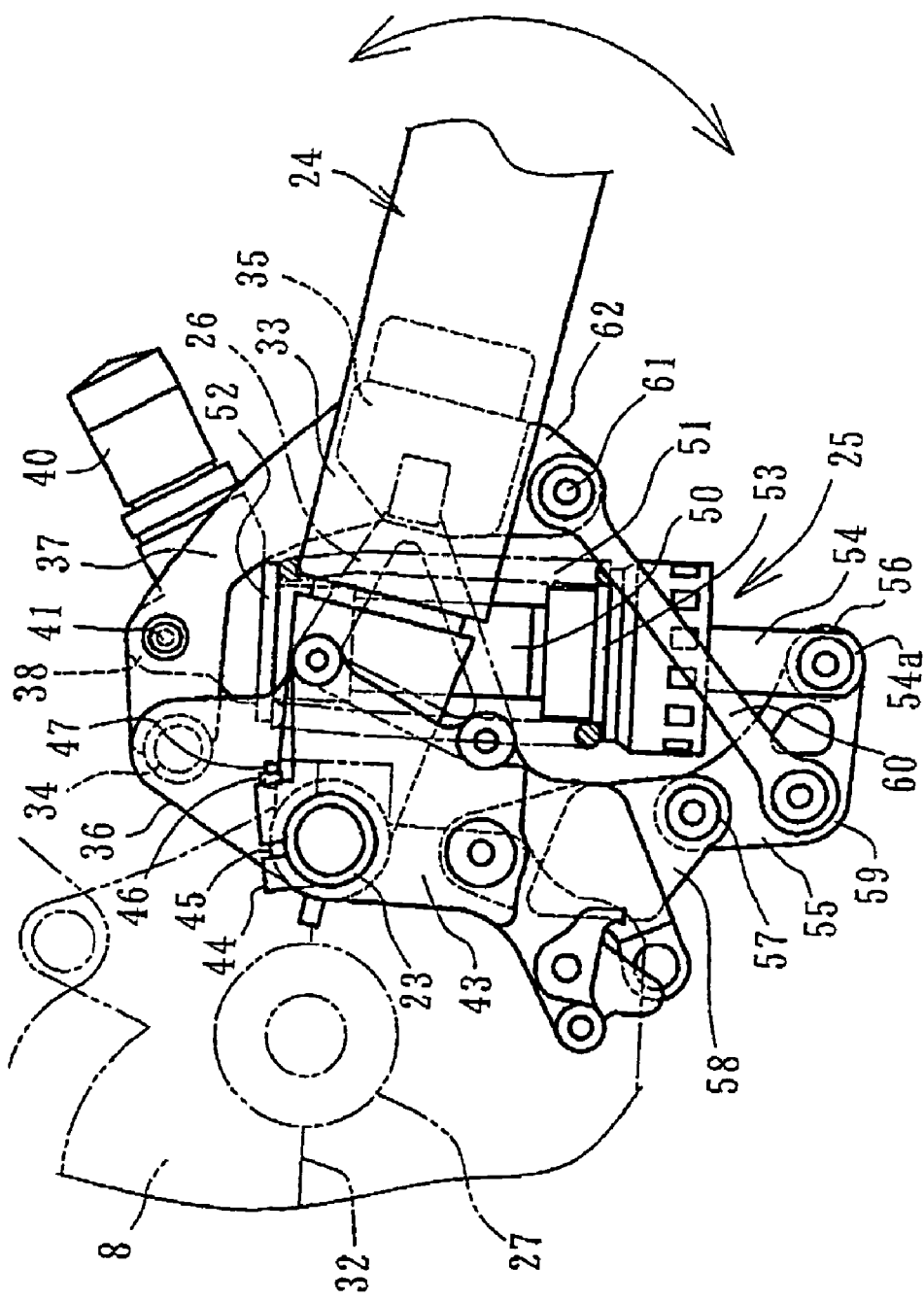
FIG. 2 is a side view showing a rear suspension portion.
Figure 3:
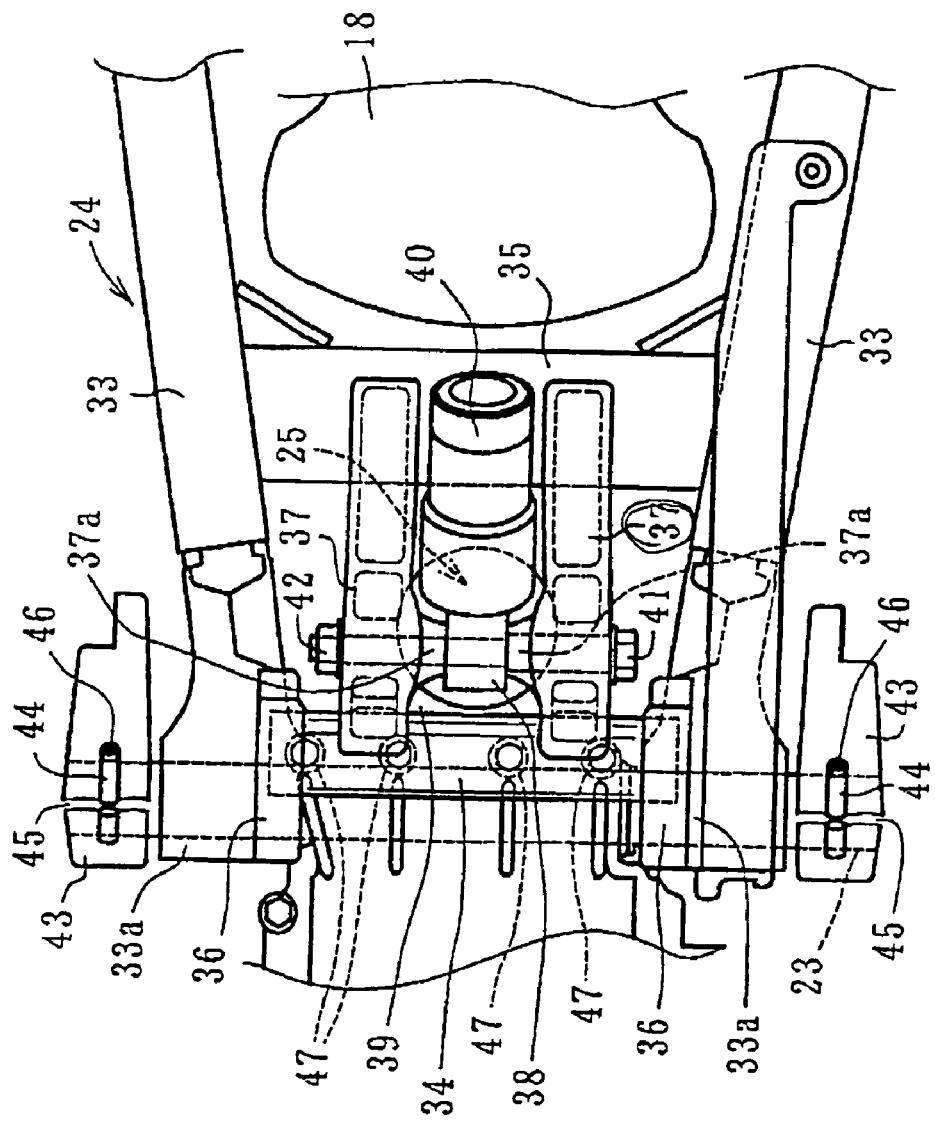
FIG. 3 is a plan view showing the rear suspension portion.
Figure 4:
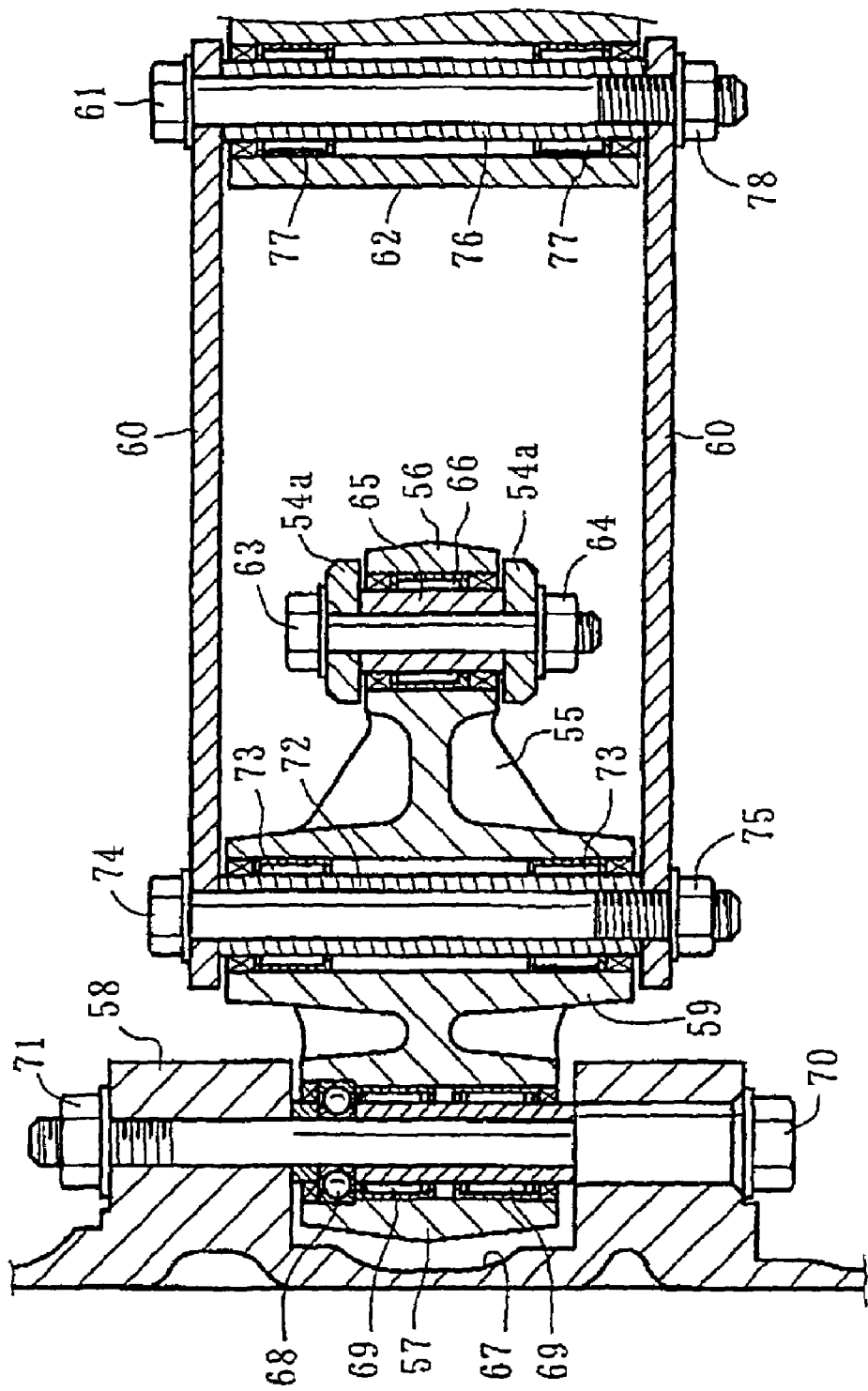
FIG. 4 is a cross-sectional view showing each of coupling points connected in a link mechanism.

FIGS. 1 to 4 show an example in which the present invention has been applied to a supporting-at-both ends type rear swing arm, and FIG. 1 is a side view showing a motorcycle according to the present embodiment; FIG. 2 is a side view showing a rear suspension portion; FIG. 3 is its plan view; and FIG. 4 is a cross-sectional view showing a link mechanism.

FIG. 1 shows a front wheel 1; a front fork 2; a head pipe 3; a handlebar 4; and a main frame 5. The main frame 5 is shaped like a longitudinal square cylinder, made of light alloy, and branches off into left and right parts from the head pipe to extend obliquely downward toward the rear.

Below the main frame 5, there is supported a series four-cylinder engine 6. There are two supporting points: a coupling point 7 between the intermediate portion of the main frame 5 and the upper portion of the cylinder; and a coupling point 9 between the rear end of the main frame 5 and the upper portion of the a mission case 8 for constituting the engine 6 at rear end.

Air is sucked at downdraft into an intake port 10 of the engine 6 from an air cleaner 11 supported by the main frame 5. A reference numeral 12 designates an injector. The air cleaner 11 is accommodated within a recess formed on the side of a base of the front portion of a fuel tank 13.

An exhaust pipe 16 extends forward from an exhaust port 15, runs below the engine 6 to extend toward the rear, and is connected to a pair of left and right mufflers 17. The left and right mufflers 17 are disposed on both sides of the rear wheel 18. A reference numeral 19 designates a radiator arranged in front of the engine 6.

A pair of left and right seat rails 20 are provided obliquely upward toward the rear from the rear end portion of the main frame 5, and with the periphery thereof enclosed, there is provided a rear cowl 21, on top of which there is provided a seat 22.

In the intermediate portion in the up-and-down direction of the mission case 8 at the rear end, the front end portion of the rear swing arm 24 is supported by the pivot shaft 23 in such a manner as to be freely rock-able in the up-and-down direction. At the rear end of the rear swing arm 24, there is supported the rear wheel 18.

FIG. 1 also shows a rear cushion 25; a step bracket 26; an output sprocket 27; a chain 28; and a driven sprocket 29.

Further, a portion from the front surface of the vehicle body to both left and right side surfaces is covered with a front cowl 30.

A case composed of a crankcase 31 of the engine 6, the mission case 8 and the like is divided into upper and lower parts, and the pivot shaft 23 is somewhat downward deviated from this slit surface 32.

As shown in FIG. 2 and FIG. 3, the rear swing arm 24 is of a supporting-at-both ends type, having a pair of left and right arm portions 33 for supporting the rear wheel 18 on its both sides, and the upper portions of the front end portion thereof are coupled together through a first cross member 34 and a second cross member 35. The first cross member 34 and the second cross member 35 are provided with an interval in the back-and-forth direction, the first cross member 34 is shaped like a pipe, a supporting portion at both ends thereof is a protruded portion 36 for protruding upward, provided on the upper surface of the left and right rear swing arms 24 at the front ends.

A tip end portion 33a of an arm portion 33 in which the protruded portion 36 is formed is a portion for bearing-supporting the pivot shaft 23, and is formed together with the protruded portion 36 by casting or the like through the use of an appropriate material such as light alloy.

The second cross member 35 is a cross member made integral with the left and right arm portions 33 with each other respectively by welding or the like. Between these first cross member 34 and second cross member 35, there are provided a pair of left and right cushion brackets 37 which extend in parallel in the back-and-forth direction with an interval from side to side. The cushion bracket 37 extends in the back-and-forth direction beyond the upper end portion 38 of the rear cushion 25, and the front and rear end portions thereof are welded to the upper surfaces of the first cross member 34 and the second cross member 35 respectively.

As is apparent from FIG. 3, there is formed substantially rectangular space 39 when observed from its plan, enclosed with the first cross member 34, the second cross member 35 and the left and right cushion brackets 37, there is located an upper portion 38 in the space, and further, a sub-cylinder 40 passes through this space 39 to rise obliquely upward from the upper portion 38 for extending toward the rear.

A shoulder bolt 41 which traverses each intermediate portion of the left and right cushion brackets 37 penetrates from one (left side in the figure) to the other (right side in the figure), and is fastened to a nut 42 provided on the other side, whereby the upper portion 38 is supported. At this time, the left and right portions of the upper portion 38 are supported by a boss 37a for protruding inwards, which has been formed at the central portion of the cushion bracket 37. For this reason, the support rigidity becomes further higher.

The pivot shaft 23 is located in the neighborhood of the first cross member 34 when observed from its plan, and at both left and right ends thereof, there are provided a pair of external auxiliary plates 43. At the rear ends of the left and right external auxiliary plates 43, there are installed a step bracket 26 (See FIG. 2) respectively.

In the external auxiliary plate 43, there is provided a long boss 44 in the back-and-forth direction, a split surface 45 is formed in the intermediate portion thereof, whereby a bolt 46 is fastened from behind the boss 44 to thereby fasten and fix the pivot shaft 23. FIG. 3 also designates a bolt 47 for fastening the upper and lower split portions of the mission case 8 from above.

As shown in FIG. 2, a rear cushion 25 has a damper 50 and a cushion spring 51, and the upper and lower portions of the cushion spring 51 are supported by retainers 52, 53 provided on the upper and lower outer periphery of the damper 50 respectively.

A joint metal 54 of the damper 50 for operating a piston which cannot be seen in the figures extends below the damper 50, and the lower end thereof is coupled to one apex portion 50 of a first link 55 which forms a substantially triangle shape. A lower end 54a of the joint metal 54 is shaped like a fork to sandwich the apex portion 56 therebetween, and the apex portion 56 is coupled by fixing with a bolt and a nut. An apex on the other end side 57 is axially installed to a stay 58 which extends from the lower portion of the mission case 8 at the rear end.

To an in-between apex portion 59 of the first link 55, there is coupled one end of a linear link arm 60, and the other end is coupled to a link pivot 61. The link pivot 61 is provided at a convex portion 62 for protruding downward from the lower end of the second cross member 35.

As shown in FIG. 4, the lower ends 54a of the joint metal 54 are shaped like a fork and sandwich the apex portion 56 therebetween, and a bolt 63 is caused to pass through an opening provided at the apex portion 56 and the joint metal 54 to be fixed by a nut 64 for thereby coupling. The bolt 63 is caused to pass through a collar 65 and a bearing 66 is used between the collar 65 and one apex portion 56.

Each of other portions has also the similar structure, and an apex 57 on the other end side is placed within a recess 67 formed at the central portion of a stay 58 in the widthwise direction thereof, and is coupled by a shoulder bolt 70 and a nut 71 through bearings 68, 69.

An apex portion 59 is coupled by a bolt 74 and a nut 75 through a collar 72 and a bearing 73.

A link pivot 61 is a bolt, and is coupled by a nut 78 through a collar 76 and a bearing 77.

Next, the description will be made of an operation of the present example. In FIG. 2 and FIG. 3, when a load is inputted to the rear wheel 18 from a road surface and the rear wheel 18 rocks in the anticlockwise direction (upward) in the figures, a link arm 60 rotates a first link 55 in the anticlockwise direction likewise. Therefore, while compressing this against a cushion spring 51, the link arm 60 presses the joint metal 54 upward to generate a damping force within the damper 50.

When the load input to the rear wheel 18 disappears, restoration of the cushion spring 51 rotates the fist link 55 and the rear swing arm 24 in the reverse direction to return to their original states.

As described above, the cushion bracket 37 has been extended long in a back-and-forth direction beyond the upper portion 38 of the rear cushion 25 and the both ends thereof have been coupled to the upper portion of the arm portion 33 on the front end side in the rear swing arm 24. Therefore, when the intermediate portion of the cushion bracket 37 is caused to support the upper portion 38 of the rear cushion, the cushion bracket 37 will be constructed to support the rear cushion at both ends. For this reason, the installation rigidity of the cushion bracket 37 becomes higher, and yet it is possible to miniaturize, to reduce the weight and to reduce the cost.

Also, the rear swing arm 24 has been provided with a pair of left and right arm portions 33, a pair of left and right cushion brackets 37 have been provided, front and rear end portions of the left and right cushion brackets 37 have been coupled to a pair of cross members consisting of the first and second cross members 34, 35, provided at an interval before and behind between the upper portions of the left and right arm portions 33 on the front end side. Therefore, when the upper portion 38 of the rear cushion is coupled to between the intermediate portions of the left and right cushion brackets 37, it will be supported by the cushion bracket 37 of the supporting at-both ends structure from both left and right sides, and the supporting portion can be provided with the highest rigidity.

Further, since there is formed space 39 enclosed with the left and right cushion brackets 37 and the first and second cross members 34, 35 in the back-and-forth direction, this space 39 can be utilized to dispose a sub-cylinder 40 of the rear cushion 25. Moreover, there is no need for the provision of special space for disposing the subsidiary cylinder 40, but the space efficiency can be improved.

Moreover, since a convex portion 62 of the link pivot 61 has been integrally provided on the lower surface of the second cross member 35, the supporting rigidity of the link pivot 61 in the convex portion 62 becomes higher, and it is possible to easily secure the rigidity of the convex portion 62.

Figure 5:
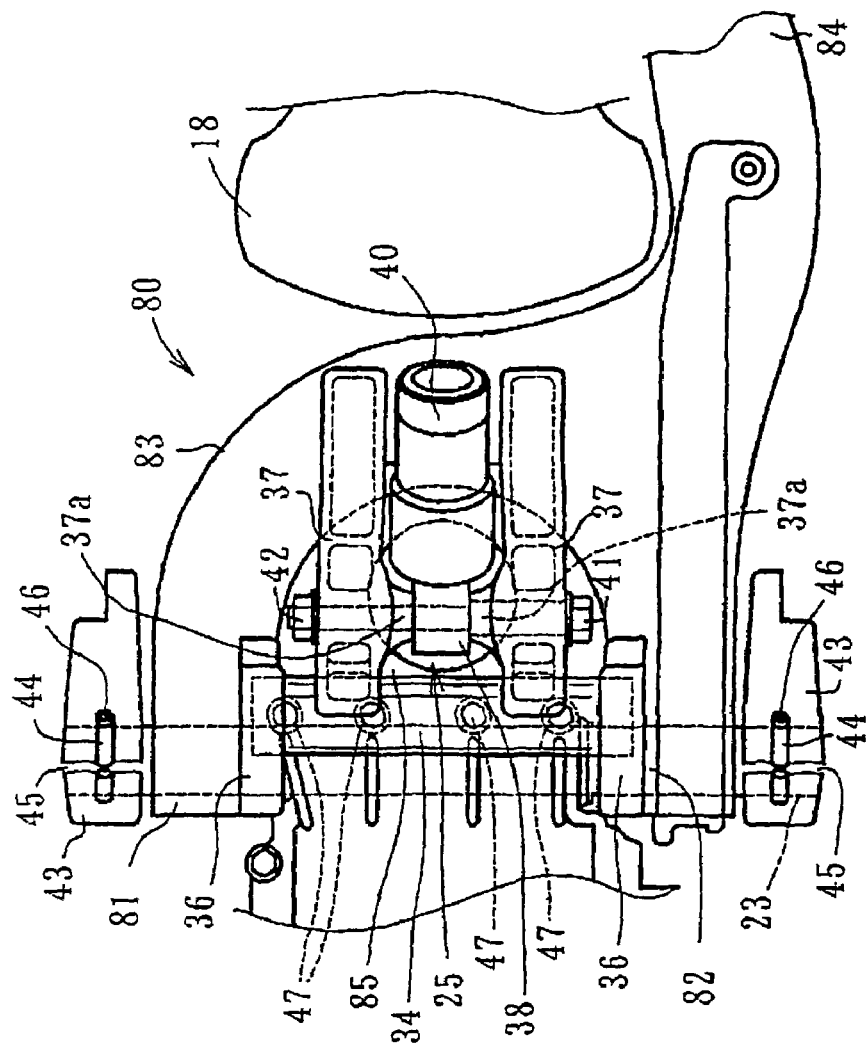
FIG. 5 is a plan view showing the rear suspension portion according to another example.

FIG. 5 shows another example in which a different type of rear swing arm is used. In this example, a rear swing arm 80 is of the cantilever type, has left and right arm portions 81 and 82, the base side of one arm portion 81 is bent on the other side to make a curvature 83 which crosses ahead a rear wheel 18, and this curvature 83 is caused to continue to a body portion 84 for extending toward the rear from the other arm portion 82, whereby the structure is arranged such that the rear wheel 18 is cantilever-supported by the body portion 84 from one side. Also, ahead of the curvature 83, there is formed space 85 between the left and right arm portions 81 and 82, and within this space 85, a rear cushion 25 is arranged in the up-and-down direction.

The structure of elements other than the rear swing arm 80 is the same as in FIG. 3, and hereinafter, common portions are designated by the common reference numerals, and repeated description will be omitted with the exception of a portion. The upper end supporting structure of the rear cushion 25 in the present example is the same as the previous example, and between a first cross member 34 which has been laid over between the left and right arm portions 81, 82, and the curvature 83, there are provided a pair of left and right cushion brackets 37. By doing so, the upper end of the rear cushion 25 is supported by a cushion bracket 37 provided at the front end portion of the cantilever type rear swing arm 80 which is liable to acquire the rigidity, and therefore, the supporting portion comes to have high rigidity. Therefore, if the same support rigidity is given, it is possible to further miniaturize and reduce the weight and to reduce the cost.

Figure 6:
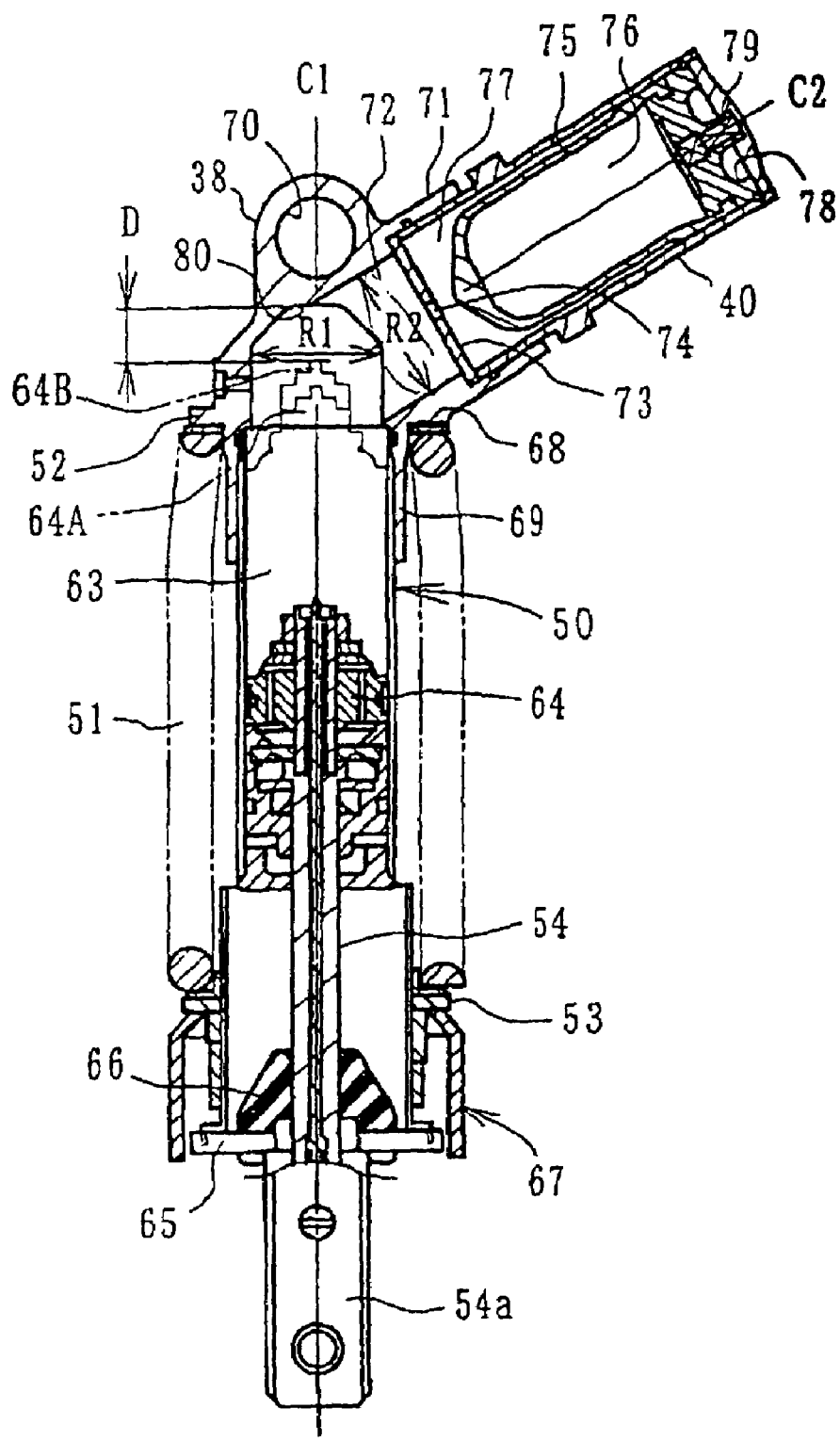
FIG. 6 is an overall cross-sectional view showing a rear cushion.

FIG. 6 is an overall cross-sectional view showing a rear cushion 25 of the present invention. A damper 50 of the rear cushion 25 has a cylinder 63 and a subsidiary cylinder 40 to be connected through an upper portion 38 which is shaped like a cap.

The cylinder 63 has a piston 64 therein, and generates a damping force by sliding the piston 64 within the cylinder 63. The piston 64 extends a piston rod 54 toward one end side in the axial direction, has an end plate 65 at its end portion, and there is provided bump rubber 66 there. A tip of the piston rod 54 which protrudes outward from the end plate 65 is a fork-shaped mounting portion 54a.

At the outer peripheral portion of the end plate 65, the position of a retainer 53 is adapted to be adjusted by an adjuster 67. The adjuster 67 rotates at multi-stages in the peripheral direction to thereby change the position of the retainer 53 in the axial direction. Between the retainer 53 and a spring seat 68 provided at a retainer 52 on the upper portion side, which is a shoulder portion of the upper portion 38, there is provided a cushion spring 51, which is adapted to generate a reaction force when contracting.

The upper portion 38 is installed to one end portion of the cylinder 63 by means of a thread portion 69, its tip portion in the axial direction constitutes an upper end portion 38, in which there is provided an installation hole 70 for passing a bolt 41 through.

Between the installation hole 70 and the seat 68, there is provided an installation area 71 protruding obliquely sideway at an angle in a substantially 45° direction, in which the subsidiary cylinder 40 is fitted. Inside the installation area 71, an oil path 72 is formed, the diameter R2 of which is nearly the same as the diameter R1 of the cylinder 63.

Between the oil path 72 and the subsidiary cylinder 40, is a bulkhead 73, at the central portion of which there is provided a drawing path 74, and when hydraulic fluid flows between the oil path 72 and within the subsidiary cylinder 40, a damping force is generated.

Within the subsidiary cylinder 40, a gas chamber 76 enclosed with an elastic film 75 is provided, and the gas chamber 76 is filled with high-pressure gas. Outside the gas chamber 76, a liquid chamber 77 is provided which communicates to the oil path 72 through the drawing path 74. An opening of the elastic film 75 is blocked by means of a sealing member 78 tightly fitted in one end of the subsidiary cylinder 40. An adjusting valve 79 is provided At the center of the sealing member 78.

An axis C1 of the cylinder 63 and an axis C2 of the subsidiary cylinder 40 constitute non-coaxial relationship at an angle of substantially 45°, the diameter R2 of the oil path 72 can be freely set within a range to the extent that any damping force due to flow of the hydraulic fluid within the oil path 72 is not generated. In other words, the configuration meeting these specifications ensures that any minor damping force due to the flow of hydraulic fluid has no significant effect on the damping performance of the rear cushion 25.

Also, an imaginary line 64A in FIG. 6 shows a normal stroke limit of the piston 64, and 64B shows a stroke limit position at the time of permanent set in fatigue of a bump rubber 66. R2 is assumed to be larger than a distance D between the position of this 64B and an end portion 66 of the cylinder 63 in the axial direction. If R2 is smaller than this, the oil path 72 will be likely to generate a damping force affecting the performance.

Next, an operation of the present embodiment will be described. Since the diameter R2 of the oil path 72 is larger than the distance D with the tip portion 80 of an inner wall of the cylinder 63 in 64B at the maximum stroke of the piston 64, the capacity of the hydraulic fluid can be secured even in the vicinity of the maximum stroke, the flow velocity thereof can be rendered uniform, and the damping force is stabilized.

Also, since an axis C1 of the cylinder 63 has been made non-coaxial to an axis C2 of the subsidiary cylinder 40, the subsidiary cylinder 40 is to be arranged at an angle with the respect to the cylinder 63, and even if the subsidiary cylinder 40 is placed side by side with the cylinder 63, the overall length can be managed to become nearly the same length as the cylinder 63 to make it compact.

Further, since the diameter R2 of the oil path 72 is substantially the same as the diameter R1 of the cylinder 63, the hydraulic fluid which passes through the oil path 72 hardly generates an unexpected damping force. Also, sufficient capacity of the hydraulic fluid can be secured.

Also, since the bulkhead 73 has been provided with a drawing path 74 as drawing means, it is possible to properly adjust the hydraulic pressure against pressure to be applied by the gas chamber 76 by adjusting the damping force even if the diameter of the oil path 72 is as large as R2. However, the drawing means is not limited to the drawing path 74, but may be a throttle valve. In addition, since the subsidiary cylinder 40 passes through space 39 to rise obliquely upward from the upper portion 38 and extend toward the rear, it is possible to install the sub cylinder 40 in the most excellent space in the space layout, and there is little possibility of interfering with other parts.

The present application invention is not limited to the above-described examples, but it is possible to change and apply in various ways, and for example, the cushion bracket can be integrally formed by forging.

Figure 7:
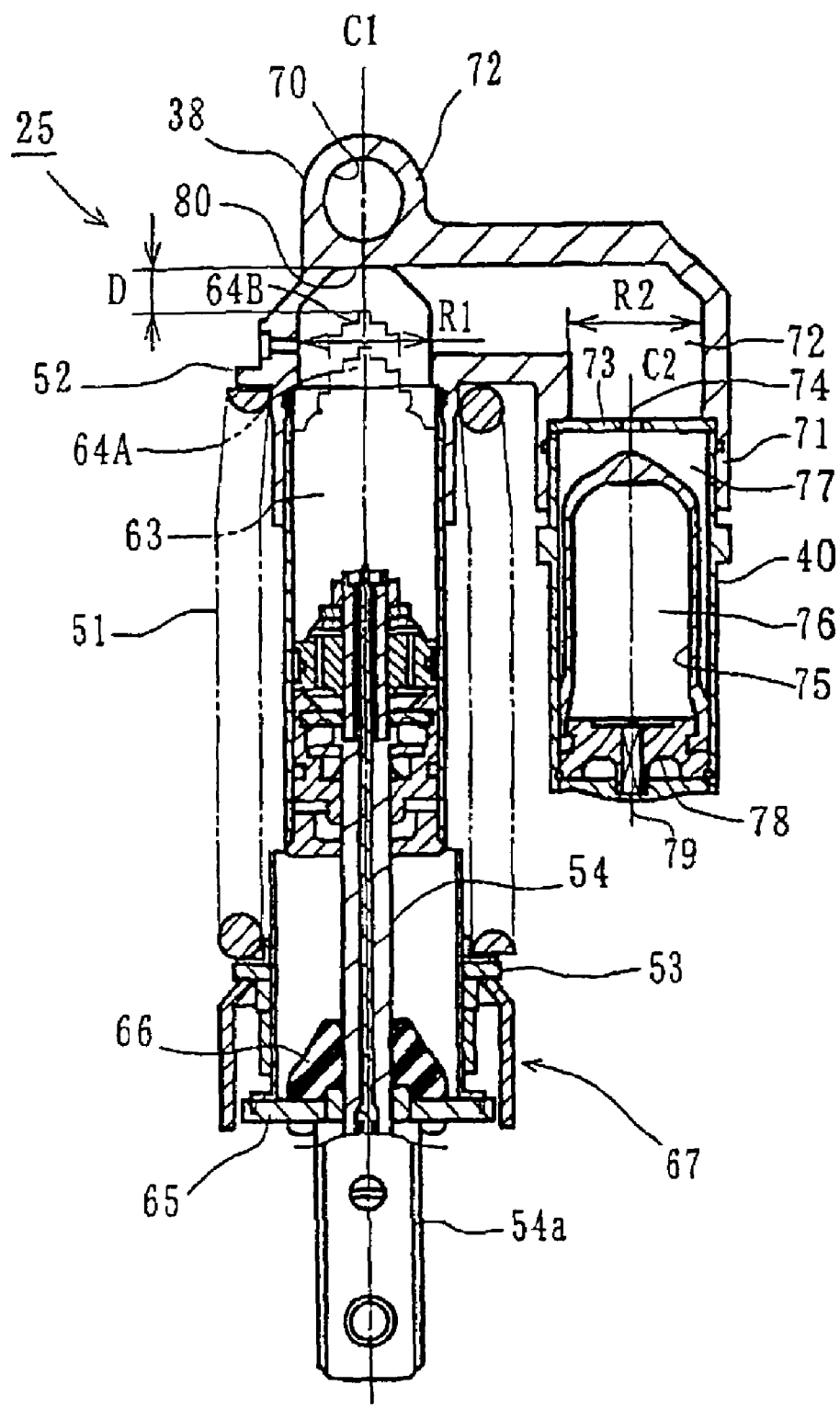
FIG. 7 is an overall cross-sectional view of another example in which the arrangement of the subsidiary cylinder has been changed.
Figure 8:
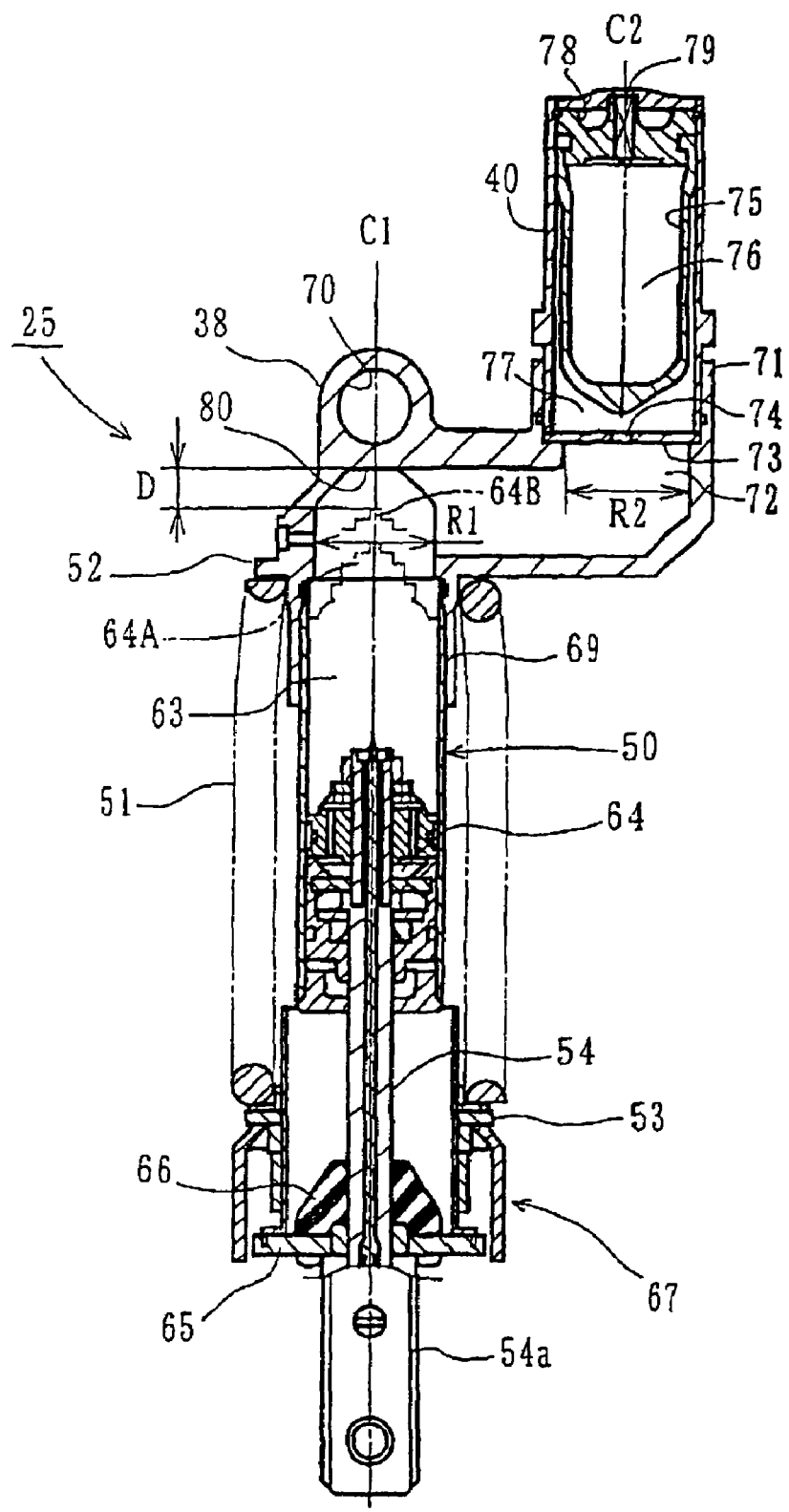
FIG. 8 is an overall cross-sectional view of another example in which the arrangement of the subsidiary cylinder has been changed.

Further, other arrangements of the cylinder 63 and the subsidiary cylinder 40 are possible. For example instead of being arranged obliquely in relationship to each other, the cylinder and the subsidiary cylinder may be arranged parallel to each other, through the upper portion 38. In this case, the subsidiary cylinder 40 may be placed side by side with the cylinder 63 as shown in FIG. 7. Also, as shown in FIG. 8, it may be possible to invert the subsidiary cylinder, contrary to FIG. 7.

In this respect, since all of the elements are the same as in FIG. 6 with the exception of the arrangement of the subsidiary cylinder 40, common portions are designated with common reference numerals, and description of other portions will be omitted. By doing so, the cylinder 63 and the subsidiary cylinder 40 become coaxial to each other, and since the machining shafts coincide with each other, the machining performance will be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for installing a rear cushion in a rear suspension, comprising:
    a rear swing arm, a front end of which is supported so as to be freely rock-able on a vehicle body side through a pivot shaft, and a rear wheel of which is supported at a rear end;
    a cushion bracket provided on a upper portion of said rear swing arm on a front end side;
    a link for coupling a lower front end portion of said rear swing arm to the vehicle body side; and
    an upper portion of said rear cushion supported by said cushion bracket, and a lower portion of said rear cushion supported by said link,
    wherein said cushion bracket extends forwardly of and rearwardly of the upper portion of said rear cushion, both a forward end portion and a rearward end portion of the cushion bracket are coupled to said rear swing arm, and wherein the upper portion of said rear cushion is supported by an intermediate portion of the cushion bracket in a back-and-forth direction,
    the rear swing arm including a pair of left and right arm portions,
    the cushion bracket including a pair of left and right cushion brackets,
    front end portions of the left and the right cushion brackets being coupled to a first cross member,
    rear end portions of the left and the right cushion brackets being coupled to a second cross member,
    the first and the second cross members being provided at an interval in the back-and-forth direction between upper portions of said left and right arm portions on the front end sides,
    wherein the upper portion of said rear cushion is supported between said left and right cushion brackets, the rear cushion having a subsidiary cylinder arranged in a space enclosed by said left and right cushion brackets on lateral sides thereof, and enclosed by said first and second cross members forward and rearward thereof.

2. The structure for installing a rear cushion according to claim 1,
    wherein the link includes a triangular shaped link member and a linear link arm,
    the linear link arm having one end connected to an apex portion on a lower front side of the triangular shaped link member, and an opposite end connected to the swing arm.

3. The structure for installing a rear cushion according to claim 1, wherein the link includes a triangular shaped link member and a linear link arm.

4. The structure for installing a rear cushion according to claim 3, wherein the linear link arm includes left and right link arms connected to the left and right sides of the triangular shaped link member.

5. The structure for installing a rear cushion according to claim 1, further comprising
    a hydraulic shock absorber in the rear cushion,
    wherein the hydraulic shock absorber includes:
        a cylinder for generating a damping force by sliding of a built-in piston,
        a subsidiary cylinder having a gas chamber disposed non-coaxially to said cylinder; and
        a crooked oil path connecting said subsidiary cylinder and said cylinder,
        wherein a diameter of said oil path is larger than a distance between a tip portion of an inner wall of said cylinder and said piston when said piston reaches a maximum compression stroke.

6. The hydraulic shock absorber in a rear cushion according to claim 5, wherein the diameter of said oil path is substantially equal to an inner diameter of said cylinder.

7. The hydraulic shock absorber in a rear cushion according to claim 5, wherein said oil path is provided with a bulkhead for partitioning the gas chamber off, the bulkhead being provided with drawing means.

8. The hydraulic shock absorber in a rear cushion according claim 1, wherein an axis of said cylinder and an axis of said subsidiary cylinder are parallel to each other.

9. A structure for installing a rear cushion in a rear suspension, comprising:
    a rear swing arm, a front end of which is supported so as be freely rock-able on a vehicle body side through a pivot shaft, and a rear wheel of which is supported at a rear end;
    a cushion bracket provided on a upper portion of said rear swing arm on a front end side;
    a link for coupling a lower front end portion of said rear swing arm to the vehicle body side; and
    an upper portion of said rear cushion supported by said cushion bracket, and a lower portion of said rear cushion supported by said link, and
    when the structure is observed from a side, said cushion bracket extends forwardly of and rearwardly of the upper portion of said rear cushion, both a forward end portion and a rearward end portion of the cushion bracket are coupled to said rear swing arm, and the upper portion of said rear cushion is supported by an intermediate portion of the cushion bracket in a back-and-forth direction, wherein the rear cushion includes a cushion spring,
the structure for installing a rear cushion further comprising
a hydraulic shock absorber in the rear cushion,
wherein the hydraulic shock absorber includes:
- a cylinder for generating a damping force by sliding of a built-in piston,
- a subsidiary cylinder having a gas chamber disposed non-coaxially to said cylinder; and
- a crooked oil path connecting said subsidiary cylinder and said cylinder,
- wherein a diameter of said oil path is larger than a distance between a tip portion of an inner wall of said cylinder and said piston when said piston reaches a maximum compression stroke.

10. The structure for installing a rear cushion according to claim 9,
the rear swing arm including a pair of left and right arm portions,
the cushion bracket including a pair of left and right cushion brackets,
front end portions of the left and the right cushion brackets being coupled to a first cross member,
rear end portions of the left and the right cushion brackets being coupled to a second cross member,
the first and the second cross members being provided at an interval in the back-and-forth direction between upper portions of said left and right arm portions on the front end sides.

11. The structure for installing a rear cushion according to claim 10,
wherein the upper portion of said rear cushion is supported between said left and right cushion brackets, the rear cushion having a subsidiary cylinder arranged in space enclosed by said left and right cushion brackets on lateral sides thereof, and enclosed by said first and second cross members forward and rearward thereof.

12. The structure for installing a rear cushion according to claim 11, wherein the subsidiary cylinder includes a gas chamber.

13. The structure for installing a rear cushion according to claim 11, wherein the subsidiary cylinder is arranged non-coaxially with the rear cushion.

14. The structure for installing a rear cushion according to claim 9, wherein the link includes a triangular shaped link member and a linear link arm.

15. The structure for installing a rear cushion according to claim 14, wherein the linear link arm includes left and right link arms connected to the left and right sides of the triangular shaped link member.

16. The structure for installing a rear cushion according to claim 9,
wherein the link includes a triangular shaped link member and a linear link arm, the linear link arm having one end connected to an apex portion on a lower
front side of the triangular shaped link member, and an opposite end connected to the swing arm.

17. The structure for installing a rear cushion according to claim 9, wherein the diameter of said oil path is substantially equal to an inner diameter of said cylinder.

18. The structure for installing a rear cushion according to claim 9, wherein said oil path is provided with a bulkhead for partitioning the gas chamber off, the bulkhead being provided with drawing means.

* * * * *